(No Model.)
G. RUMPF.
MANUFACTURE OF ACETONE.
No. 385,777. Patented July 10, 1888.
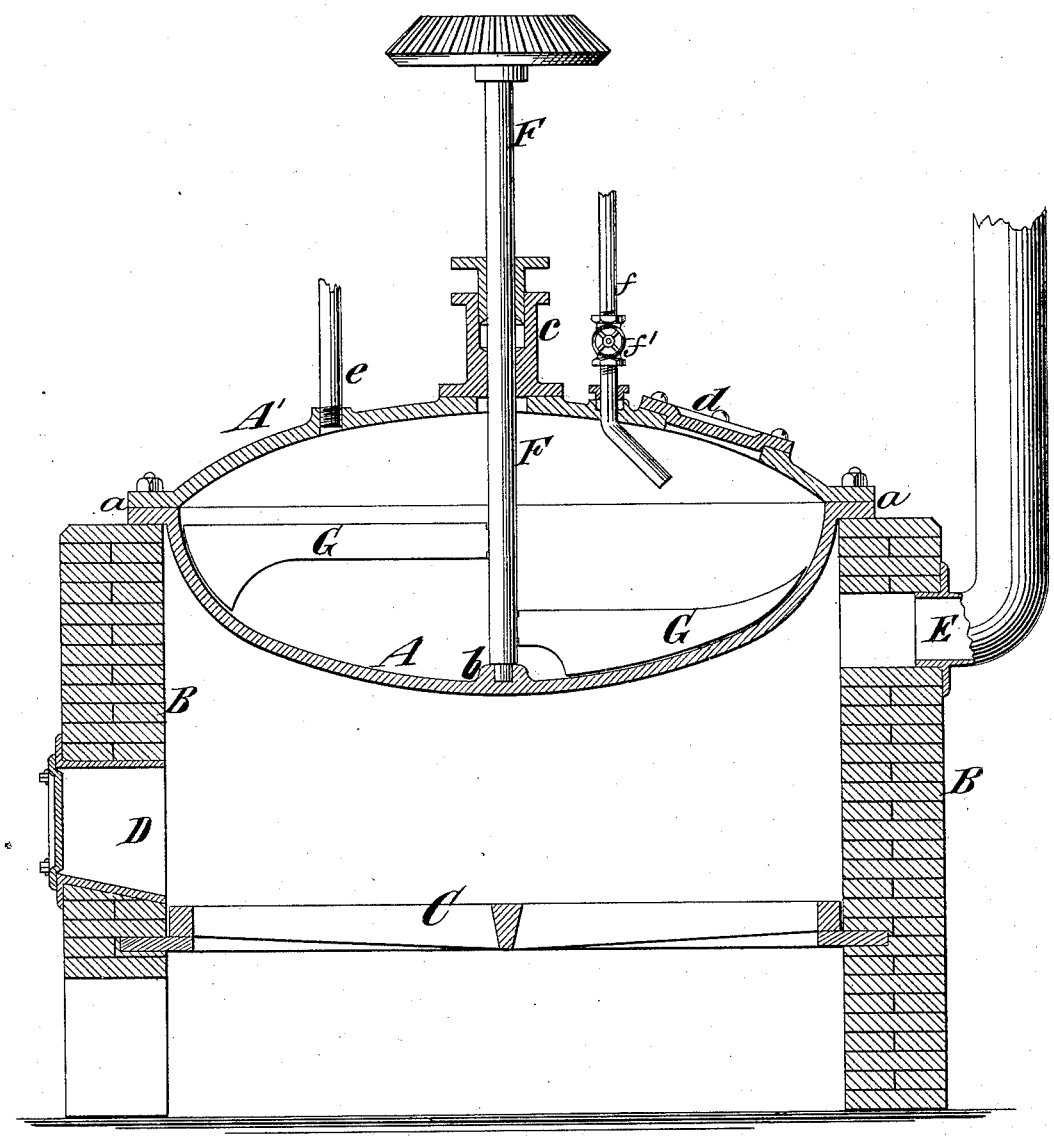
Witnesses
Emil Herter
C. Sundgren
Inventor
Dr Gustav Rumpf
by his Attys
Brown & Hall

UNITED STATES PATENT OFFICE.

GUSTAV RUMPF, OF FRANKFORT-ON-THE-MAIN, GERMANY, ASSIGNOR TO FRANZ ROESSLER AND JACOB HASSLACHER, OF NEW YORK, N. Y.

MANUFACTURE OF ACETONE.

SPECIFICATION forming part of Letters Patent No. 385,777, dated July 10, 1888.

Application filed June 23, 1886. Serial No. 205,973. (No model.)

*To all whom it may concern:*

Be it known that I, GUSTAV RUMPF, a subject of the Emperor of Germany, residing at Frankfort-on-the-Main, Germany, have invented a new and useful Improvement in the Manufacture of Acetone, of which the following is a specification.

In making acetone by dry distillation of acetates—as acetate of lime—it has before my invention been thought possible to obtain only less than half of the acetone.

Dr. Hermann Hager, in his *Hand buch der Pharmaceutischen Praxis*, published in Berlin in 1882, states, under the head of "Acetone," that it is possible to obtain an average yield from chemically-pure acetate of lime of only fifteen per cent. (15%) of acetone, while the theoretical yield from chemically-pure acetate of lime is thirty-four per cent., (34%.)

I have discovered that if the acetates are subjected for distillation to a low heat and approximately-uniform temperature and the process extended over several hours the yield of acetone will be greatly increased, and will approach very nearly the theoretical yield of any particular acetate, which in the case of good gray or commercial acetate of lime is about twenty-seven per cent., (27%.) I have also discovered that in the process of subjecting acetates in a closed vessel to heat applied external to the vessel for distilling acetone from the acetates the desired slowness of distillation and uniformity of temperature may be secured by stirring the acetates so that all portions of the mass will be subjected to the heat resulting from direct contact with the bottom of the vessel, and by admitting free steam from time to time into direct contact with the acetates in case of any undesirable rise in temperature within the vessel.

My invention consists in an improvement in the method of obtaining acetone from acetates by destructive distillation, consisting in subjecting the acetates in a closed vessel to slow destructive distillation at a low and approximately-uniform temperature, and it is also well to stir the acetates during such distillation.

To secure the best results, it is also well to subject the acetates to the action of steam in direct contact with them. The stirring of the acetates during distillation conduces to making a slow process and comparatively low temperature—about three hundred degrees centigrade, (300° C.,) for example—most effective for purposes of distillation, and by the admission of steam to the closed vessel any rise in temperature therein can be instantly checked.

By the method which forms the subject of my invention, and on a commercial scale, I am able to obtain from even commercial acetates a larger yield of acetone than that which has been practically obtained heretofore from chemically-pure acetates.

In producing acetone by destructive distillation of acetates the crude acetone will be found to contain oils and other compounds and impurities, high temperatures acting in such a manner that the acetone is partly destroyed and transformed into oils and other compounds; hence the great advantage of maintaining an approximately-uniform temperature and of making the distillation a slow process, which necessitates only a comparatively low heat.

The tarry impurities of the pyrolignites will form oils, and the higher fatty acid salts which may be present in the pyrolignites will yield different ketones, which will give much trouble in the employment of acetone, especially if the manufacture of chloroform is intended therefrom.

A further object of my invention is therefore to purify the crude acetone and to eliminate therefrom the oils, ketones, and other compounds which would interfere with obtaining the best result in the manufacture of chloroform from acetone.

The invention also includes the improvement in the method of purifying acetone, consisting in treating the crude acetone in a state of dilution with lime to remove the higher ketones and other compounds.

The invention also includes the improvement in the method of purifying acetone, consisting in diluting the acetone with water, and thus separating the oily matters because they are not soluble in water, and after thus effecting the separation removing the oily matters and other compounds.

The invention also involves the method of purifying acetone, consisting in diluting the crude acetone with water to separate the oily matters and treating with lime to remove the higher ketones and other compounds, and in then subjecting the dilute acetone to rectification, preferably in a column-still, until nearly anhydrous.

In the accompanying drawing, I have represented in sectional elevation a simple form of still, in which acetone may be obtained by destructive distillation.

In carrying out my invention I prefer to employ, for purposes of distillation, the apparatus forming the subject of my application for Letters Patent, Serial No. 189,144, filed January 20, 1886; but the apparatus which is shown in the accompanying drawing, will answer the purpose of illustration.

A designates a vessel, which may be of cast-iron, closed by a cover, A', and which is arranged over a furnace. This vessel A should be of large horizontal area as compared with its depth, and should have its bottom flat, or, if curved, of large radius, so that the vessel when containing the desired quantity will only have a comparatively thin layer. Acetates are poor conductors of heat, and if the heat had to penetrate a thick layer the lower portions of the mass might be more liable to overheat.

The furnace contains an ordinary grate, C, a fire-door, D, and the still may be supported by its flanges $a$ resting upon the upper walls of the furnace. The products of combustion may escape from the furnace by a pipe or passage, E.

Within the still I have represented an upright shaft, F, which rests in a step-bearing, $b$, at the bottom, and works through a stuffing-box, $c$, in the top of the still. This shaft may have rotary motion communicated to it by gearing, and is here shown as having a bevel-wheel upon its upper end. The shaft F is provided within the still with stirrers G, which serve to keep the acetates in motion and prevent their caking on the bottom of the still. The acetate from which acetone is made may be introduced in suitable quantity through a man-hole, $d$, and the vapors of distillation may be taken off through a pipe, $e$, and conducted to a condensing worm or coil. (Not here shown.)

$f$ designates a steam-pipe, through which steam may be introduced under control of a cock, $f'$, for regulating the temperature within the still.

During the process of distillation the shaft F and stirrers G are operated, and steam is introduced in suitable quantity within the still to maintain a temperature therein which will not rise above about 400° centigrade, and is generally maintained in the neighborhood of 300° centigrade, and enables me to obtain a yield of acetone (from gray acetate of lime) which will come pretty near the theoretical quantity.

The admission of free steam into direct contact with the contents of the vessel A furnishes an effective means of at once checking any undesirable rise of temperature in the vessel.

In order to obtain acetone which may be used successfully in making chloroform, and for other purposes where oily impurities and different ketones would be very disadvantageous, it is of highest importance to have a thorough and not too costly method of getting rid of these undesirable substances. I have found that lime-milk is a very effectual agent to precipitate a part of the impurities mentioned when it acts on the acetone in a state of dilution. The crude acetone, when subjected to the lime treatment, should not exceed the density of about .965° specific gravity. The dilution with water has at the same time the advantage that a large quantity of the oils which are not held in solution will flow upon the surface of the liquid and may be easily removed or skimmed off. It is useful to stir up several times the mixture of dilute acetone with lime in order to aid the separation of impurities therefrom. The purification by lime, however, does not take away all the undesirable substances and must be completed by rectification. For this purpose the acetone may be distilled in a simple still before or after the lime treatment, and in any case it is necessary to dilute the acetone to about the above-mentioned point.

The separation of the acetone from the higher ketones and other impurities depends chiefly upon the differences in the boiling-points, and therefore one distillation will scarcely prove sufficient, because it is necessary to get the product in a nearly anhydrous state, so that the differences in boiling-points may act to their full extent. Therefore a final and, if necessary, a reiterated rectification in a column-still will prove very effectual, leaving substantially all the foreign matters as residue.

When the acetate is introduced in a fine state into the still, it is preferable to both stir it and subject it to the action of steam. If the acetate were introduced into the still in such small fragments as to permit the steam to circulate among them, good results might be obtained by the use of steam alone without stirring. In either case the process of distillation, owing to the fact that a low temperature is rendered available, is made a slow one and thus conduces to a large yield of acetone.

What I claim as my invention, and desire to secure by Letters Patent, is—

1. The improvement in the method of obtaining acetone from an acetate, consisting in subjecting the acetate in a closed vessel to slow destructive distillation at a low and approximately-uniform temperature, substantially as herein described.

2. The improvement in the method of obtaining acetone from an acetate, consisting in subjecting the acetate in a closed vessel to slow destructive distillation at a low and approximately-uniform temperature and stirring the same during such distillation, substantially as herein described.

3. The improvement in the method of obtaining acetone from an acetate by destructive distillation in a closed vessel, consisting in heating the vessel from the outside thereof and in subjecting the acetate to the action of steam in direct contact therewith during the distillation to prevent too high temperatures, substantially as herein described.

4. The improvement in the method of obtaining acetone from an acetate by destructive distillation in a closed vessel, consisting in heating the vessel from the outside thereof, in stirring the acetate, and in subjecting the acetate to steam in direct contact therewith to prevent too high temperatures and to maintain the temperature approximately uniform, substantially as herein described.

5. The improvement in the method of purifying acetone, consisting in treating the crude acetone in a state of dilution with lime to remove the higher ketones and other compounds, substantially as herein described.

6. The improvement in the method of purifying acetone, consisting in diluting the crude acetone with water to separate the oily matters, and treating with lime to remove the higher ketones and other compounds, and in then subjecting the dilute acetone to rectification until nearly anhydrous, substantially as herein described.

7. The improvement in the method of purifying acetone, consisting in diluting crude acetone with water to separate the oily matters, and treating with lime to remove the higher ketones and other compounds, and in afterward subjecting the dilute acetone to rectification in a column-still, substantially as herein described.

8. The improvement in obtaining acetone from an acetate, consisting in subjecting the acetate in a closed vessel to slow destructive distillation at a low and approximately-uniform temperature, in diluting the resulting crude acetone to separate oily matters and treating it with lime to remove higher ketones and other compounds, and in afterward subjecting the dilute acetone to rectification in a column-still, substantially as herein described.

GUSTAV RUMPF.

Witnesses:
C. HALL,
FREDK. HAYNES.

Corrections in Letters Patent No. 385,777.

It is hereby certified that in Letters Patent No. 385,777, granted July 10, 1888, upon the application of Gustav Rumpf, of Frankfort-on-the-Main, Germany, for an improvement in the "Manufacture of Acetone," errors appear in the printed specification requiring correction as follows: In line 21, page 1, the word "low" should read *slow*; and in line 83, page 2, ".965°" should read *.965;* and that the said Letters Patent should be read with these corrections therein that the same may conform to the record of the case in the Patent Office.

Signed, countersigned, and sealed this 14th day of August, A. D. 1888.

[SEAL.]
D. L. HAWKINS,
*Assistant Secretary of the Interior.*

Countersigned:
BENTON J. HALL,
*Commissioner of Patents.*